United States Patent [19]
Calame

[11] 4,396,846
[45] Aug. 2, 1983

[54] STEPPING MOTOR WITH ROTOR-POSITIONING MAGNET

[75] Inventor: Jean-Pierre Calame, La Chaux-de-Fonds, Switzerland

[73] Assignee: Fabriques d'Horlogerie de Fontainemelon, S.A., Switzerland

[21] Appl. No.: 328,217

[22] Filed: Dec. 7, 1981

[30] Foreign Application Priority Data

Dec. 9, 1980 [CH] Switzerland ............... 9071/80

[51] Int. Cl.³ .................................. H02K 37/00
[52] U.S. Cl. ........................ 310/49 R; 310/162
[58] Field of Search ..................... 310/162–165, 310/49, 46, 41, 190–193, 209, 181

[56] References Cited

U.S. PATENT DOCUMENTS 3,719,839  3/1973  Endo ............................ 310/49
4,103,191  7/1978  Kawamura et al. ........... 310/49

Primary Examiner—Donovan F. Duggan
Attorney, Agent, or Firm—Allegretti, Newitt, Witcoff & McAndrews, Ltd.

[57] ABSTRACT

A ring (16) of non-magnetic material is engaged in the opening bounded by the pole shoes (6,7) of a pole plate (5), between the pole shoes and the rotor (12).

A magnet (18) serving to define the position of rest of the rotor is mounted on this ring, which can be accurately positioned by means of a slot (11) provided in the pole plate.

9 Claims, 4 Drawing Figures

STEPPING MOTOR WITH ROTOR-POSITIONING MAGNET

BACKGROUND OF THE INVENTION

The present invention relates to miniature stepping motors adapted for use particularly in electronic analogue-display timepieces such as wrist watch movements. The invention relates more particularly to a stepping motor of the type described in particular in Swiss Pat. No. 616.302, which contains a stator having two pole shoes bounding a substantially circular opening, a permanent magnet rotor mounted in this opening, and a fixed magnet located near the rotor in order to define a position of rest thereof.

In all motors of the type described above, the rotor-positioning magnet in mounted directly on the stator. This solution is not entirely satisfactory, because the interaction forces between the magnet and the stator make it difficult to place the magnet in position on the stator. This drawback could be overcome by fastening the magnet to a part made of non-magnetic material, such as the base-plate of a watch movement. In this case, however, it would be more difficult to ensure exact positioning of the magnet in relation to the stator.

SUMMARY OF THE INVENTION

The main object of the present invention is to provide a stepping motor having a fixed magnet and arranged in such a manner that the positioning of this magnet is facilitated. Another object of the invention is to ensure the position of the magnet relative to the stator.

According to the invention the fixed magnet is carried by a ring of non-magnetic material which is engaged in the substantially circular opening of the stator.

This ring permits to achieve an accurate positioning of the magnet with respect to the stator. This ring also constitutes a mechanically strengthening of the stator and it serves as guiding means for the rotor during the mounting thereof.

In a preferred embodiment of the invention the ring is provided with a lug and the stator has a recess for receiving said lug when the ring is mounted on the stator. This facilitates the accurate positioning of the magnet with respect to the stator.

BRIEF DESCRIPTION OF THE DRAWINGS

The invention will be better understood from the following detailed description of two embodiments taken in conjunction with the accompanying drawings in which.

DESCRIPTION OF PREFERRED EMBODIMENTS

Figure 1:
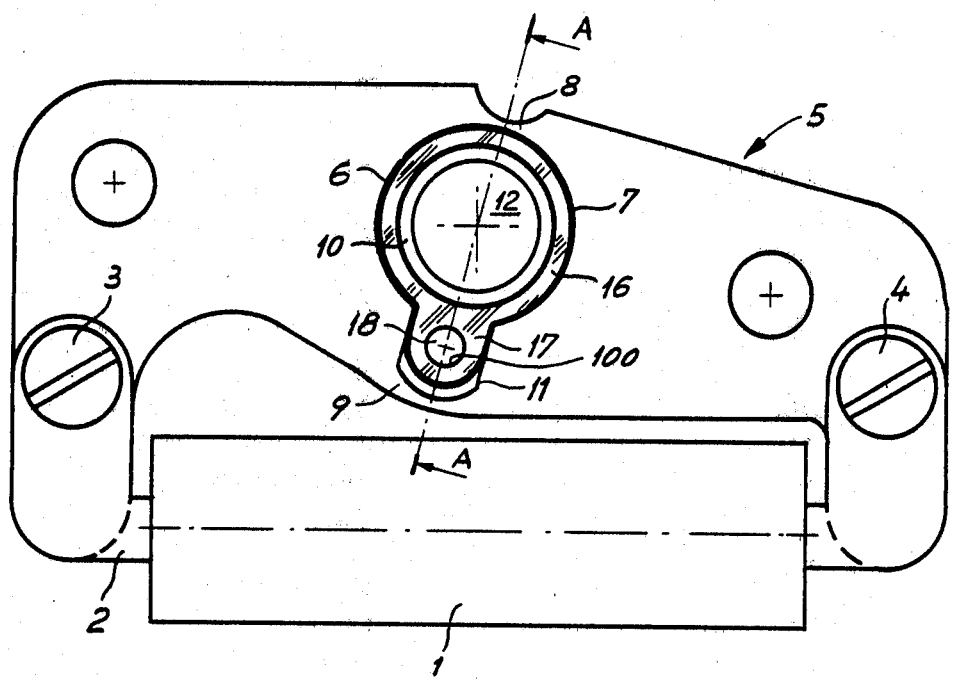
FIG. 1 is a plan view of a first embodiment of a motor according to the invention.
Figure 2:
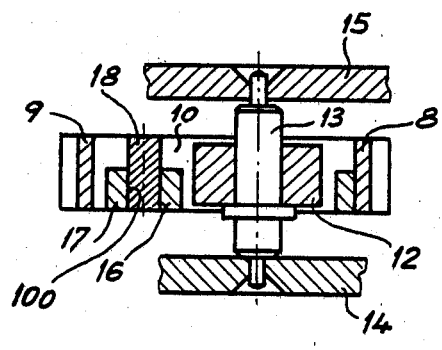
FIG. 2 is a view in vertical section taken along line A—A of the motor shown in FIG. 1.

As illustrated in FIGS. 1 and 2, the motor is composed of a stator which comprises a coil 1 wound around a core 2 of soft magnetic material. The two ends of the core are fastened by screws 3 and 4 to a pole plate 5 also belonging to the stator, and which is also of soft magnetic material. The pole plate consists of a single piece incorporating two pole shoes 6 and 7 connected together by isthmuses 8 and 9 and bounding a generally circular opening 10 having a slot 11 facing the isthmus 9.

A rotor, consisting of a permanent magnet 12 mounted on a shaft 13, is located in the opening 10. The axis of this shaft, which coincides substantially with that of the opening 10, pivots in two bearings 14 and 15.

A ring 16, made of non-magnetic material, is engaged in the opening 10, between the pole plate and the rotor. This ring has a lug 17, which is engaged in the slot 11 and which is pierced at 100 to form a socket, inside which is fixed a magnet 18. This magnet is intended to determine the position of rest of the rotor, as taught by Swiss Pat. No. 616.302, which has already been mentioned.

Figure 3:
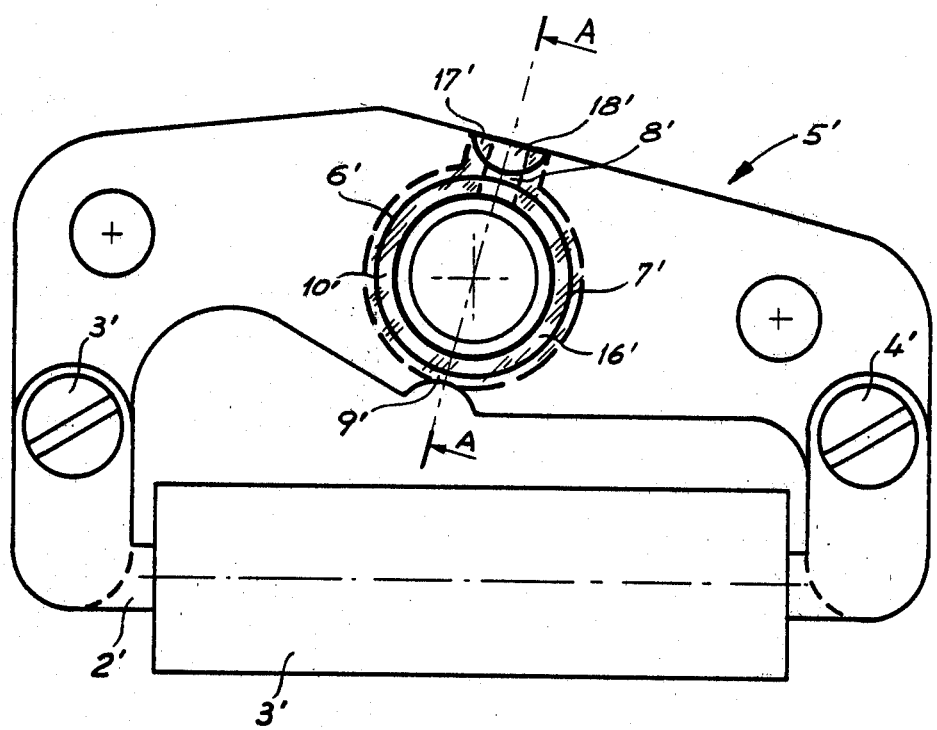
FIG. 3 is a plan view of a second embodiment of a motor according to the invention.
Figure 4:
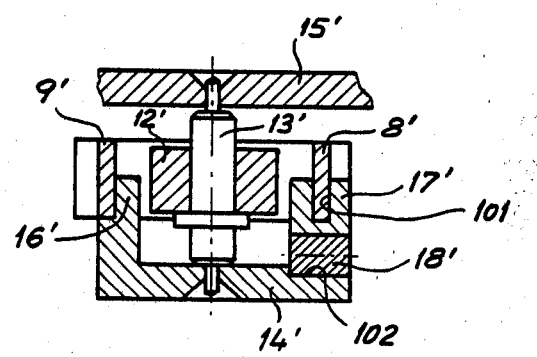
FIG. 4 is a view in vertical section taken along line A—A of the motor shown in FIG. 3.

Reference will now be made to FIGS. 3 and 4, which show a second embodiment of the motor according to the invention. Elements common to the two embodiments have been given the same references whith the addition of the "prime" sign. As can be seen in these Figures, the opening 10' of the pole plate 5' no longer has a slot. The lower bearing 14' of the rotor and the ring 16' are in one piece. The ring 16', which projects from the pole plate, is provided with a lug 17', in which is pierced a groove 101 to receive the isthmus 8'. The groove 101 has a width increasing from the middle to each end thereof as the isthmus 8' has, so that the latter can fit exactly in said groove 101. Below this groove 101 a socket is pierced at 102 in said lug 17', inside which is fixed a rotor-positioning magnet 18'.

Thus, in both embodiments of the invention described above, the placing in position of the magnet 18,18' and its accurate positioning relative to the stator are greatly facilitated, on the one hand by the previous fastening of the magnet on a non-magnetic ring, and on the other hand by the mounting of this ring in the pole plate in an angular position ensured by positioning means provided both on the ring and on the pole plate.

The ring is advantageously made of injection-moulded plastic. The positioning magnet can be then fastened to the ring either during the injection-moulding operation or after that operation, for example by driving-in.

As an alternative, the ring may be made of a conductive material, such as brass. In this case the ring is machined by cutting before the magnet is driven into a hole provided in said ring for that purpose. The ring then serves as an eddy-current brake for the rotor.

In both the examples described above the pole shoes of the stator are integral with each other, but it is obvious that the invention is also applicable in the case of a stator in which the pole shoes are constituted in two different pieces. In both cases, the ring carrying the magnet also has the effect of mechanically strengthening the pole plate and of guiding the rotor during its mounting.

Finally, with regard to the embodiment shown in FIGS. 3 and 4, it should be noted that the fact that the magnet-support ring and the rotor bearing 14' are made in one piece makes it possible to obtain minumum tolerances for the motor.

While there are shown and described several preferred illustrative embodiments of the invention, it will be understood by those skilled in the art that other modifications may be made within the principles of the invention and the scope of the appended claims.

I claim:

1. A miniature stepping motor comprising a stator having two pole shoes bounding a generally circular opening, two bearings, a rotor located in said opening and pivotally mounted on said bearings, a ring of a non-magnetic material provided with a socket and engaged in said opening between said rotor and said pole shoes and a magnet disposed in said socket, said magnet defining a position of rest of said rotor.

2. The motor of claim 1, wherein said ring is made of plastic.

3. The motor of claim 2, wherein said magnet is enclosed inside said plastic.

4. The motor of claim 1, wherein said ring is made of a conductive material.

5. The motor of claim 1, further comprising means for accurately positioning said ring with respect to said stator.

6. The motor of claim 5, wherein said positioning means comprises a lug provided on said ring and a recess provided in the stator for receiving said lug.

7. The motor of claim 6, wherein said magnet is mounted in said lug.

8. The motor of claim 1, wherein one of said bearings is integral with said ring.

9. The motor of claim 1, wherein said pole shoes are integral with each other.

* * * * *